April 13, 1948.  J. V. MARTIN  2,439,742
DISTORTABLE CIRCLE TIRE
Filed Jan. 24, 1944   5 Sheets-Sheet 1
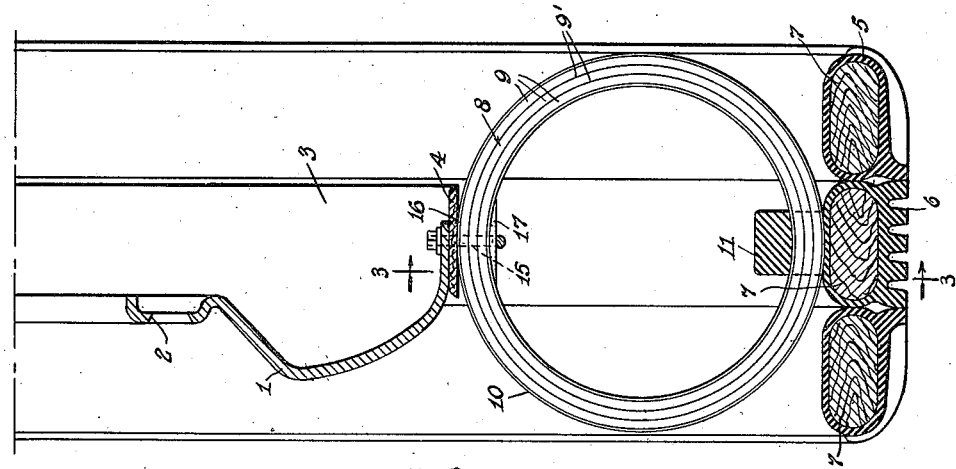
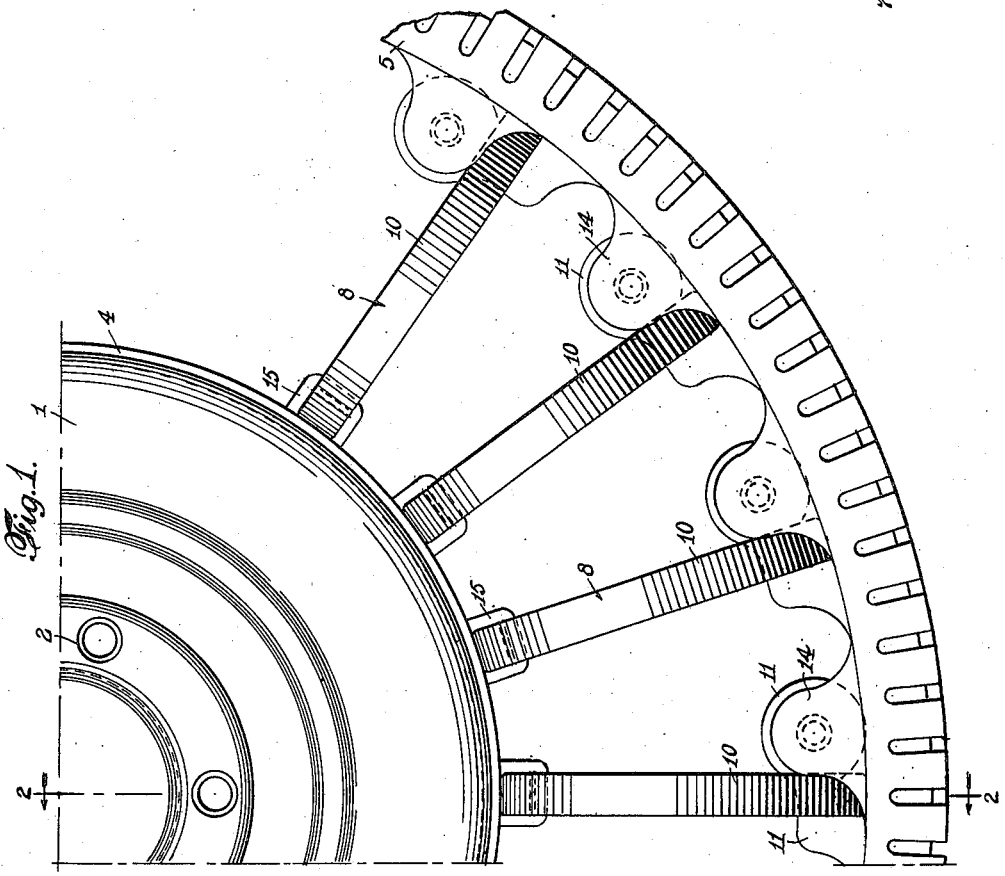
INVENTOR.
James V. Martin April 13, 1948. J. V. MARTIN 2,439,742
DISTORTABLE CIRCLE TIRE
Filed Jan. 24, 1944 5 Sheets-Sheet 2
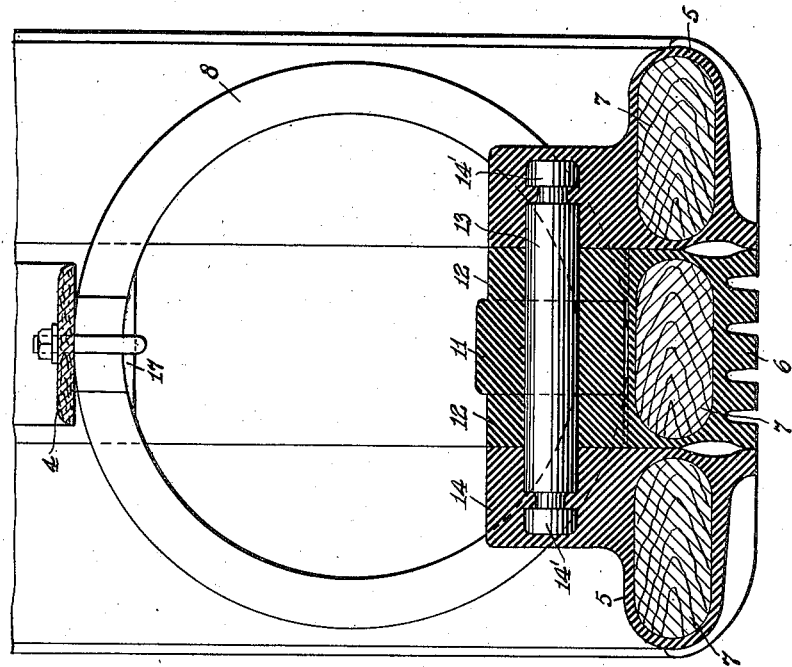
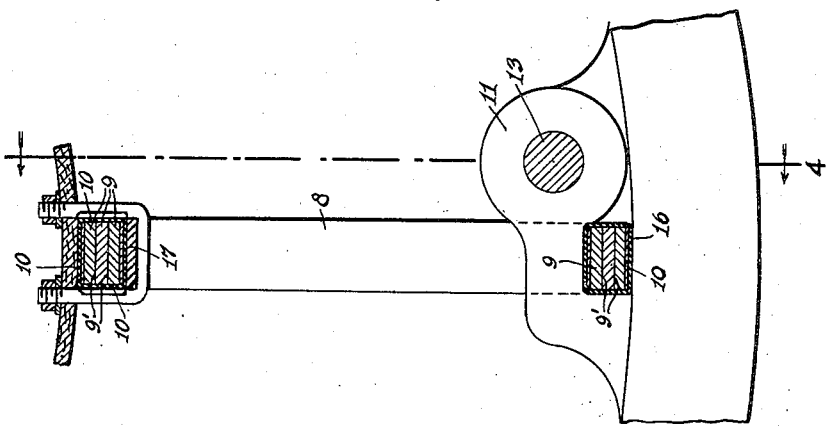
INVENTOR.
James V. Martin April 13, 1948. J. V. MARTIN 2,439,742
DISTORTABLE CIRCLE TIRE
Filed Jan. 24, 1944 5 Sheets-Sheet 3
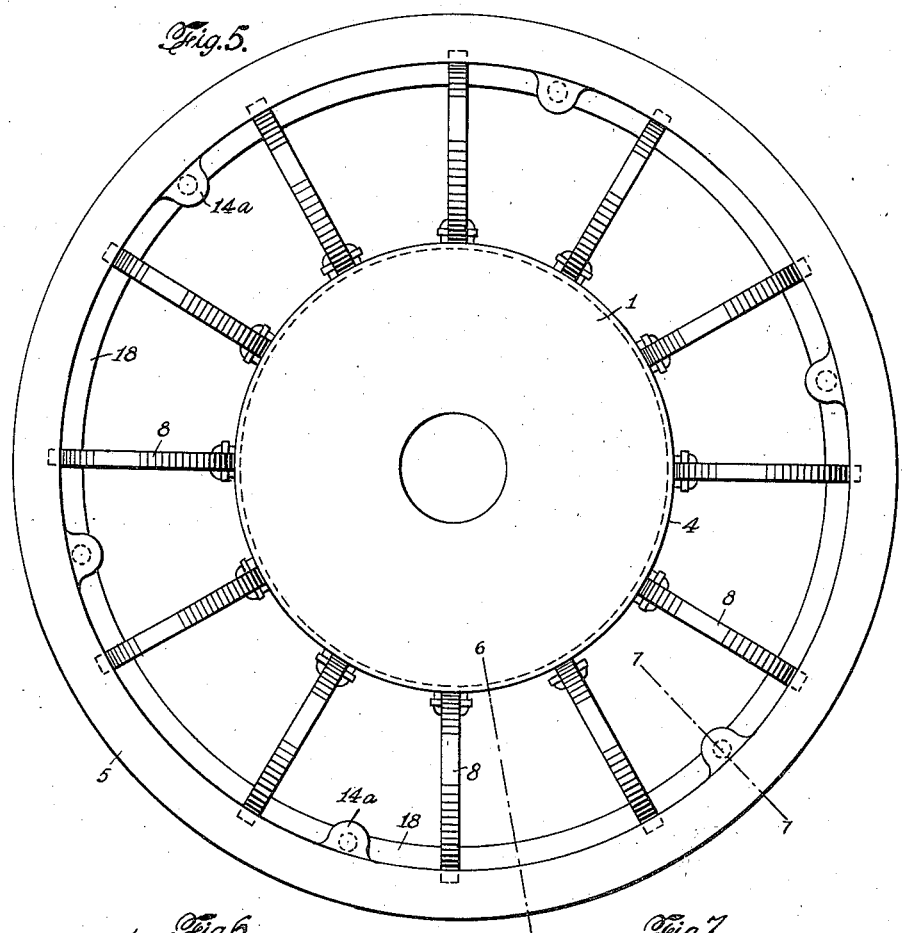
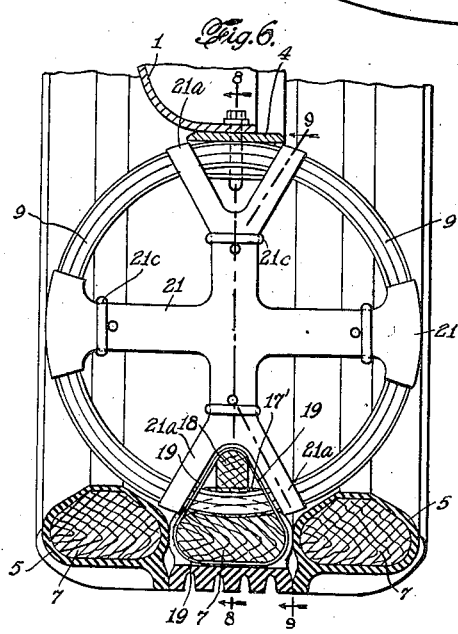
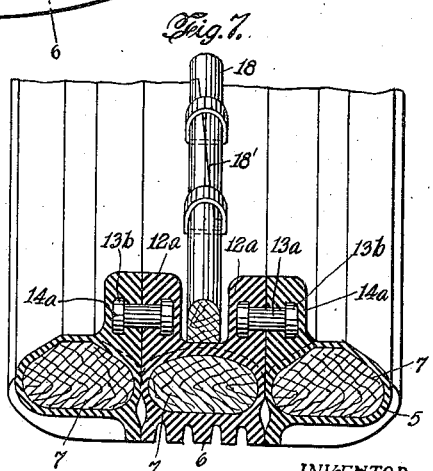
INVENTOR.
James V. Martin April 13, 1948.  J. V. MARTIN  2,439,742
DISTORTABLE CIRCLE TIRE
Filed Jan. 24, 1944  5 Sheets-Sheet 4

INVENTOR.
James V. Martin

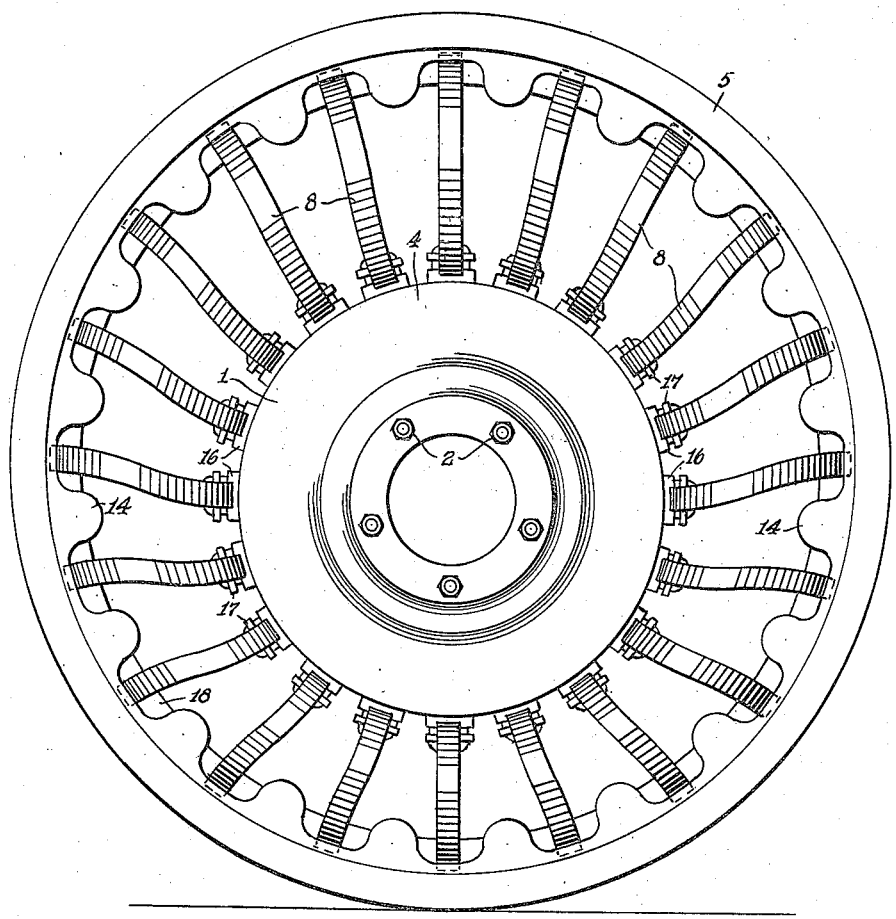

Patented Apr. 13, 1948

2,439,742

UNITED STATES PATENT OFFICE 2,439,742

DISTORTABLE CIRCLE TIRE

James V. Martin, Paramus, N. J.

Application January 24, 1944, Serial No. 519,442

14 Claims. (Cl. 152—260)

This invention relates to tires for vehicles of all sorts, but more particularly for aeroplanes and automobiles. The primary object of the invention is to provide a practical and safe substitute for the bouncing, skidding and side swaying air bags known as pneumatic tires.

A further object of my invention is to provide a bullet injury obviating type of tire which can be employed in war without the extreme vulnerability inherent in an inflated bag type tire.

A still further object of my invention is to provide a safe and resilient substitute for inflated rubber bag type tires which can be built out of readily available non-critical materials, saving rubber and steel.

Additional objects of my invention will readily become apparent as I proceed to disclose the nature and construction of some exemplifying forms of my invention as shown in the drawings annexed hereto.

Figure 1 shows my invention in a quadrant side elevational view.

Figure 2 shows, partly in section, a view taken along the line 2—2 of Figure 1.

Figure 3 is a view partly in section, showing one of the small hoop units shown in Figure 1.

Figure 4 is a view partly in section showing the tread hoops, fillers and lock pin and indicating the small distortable circle hoop unit; view is taken along the line 4—4 of Figure 3.

Figure 5 is a view in side elevation of an alternative construction for my tire assembly, while Figure 6 is a view partly in section taken along the line 6—6 of Figure 5.

Figure 7 is also a view partly in section and taken along the line 7—7 of Figure 5.

Figure 10 is a side elevational view of my invention having 20 small distortable circle hoop units and having no axle load upon it, while Figure 11 is a view showing the proximate shape taken by the smaller hoops when under an extreme overload.

Proceeding to the more detailed explication of my invention like numerals will represent like parts throughout the several views.

Figure 8:
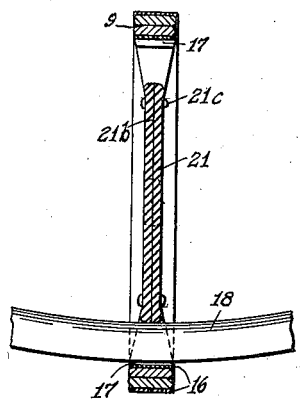
Figure 8 is a view partly in section taken along the line 8—8 of Figure 6

1 is the wheel disc of an automobile wheel, showing conventional demountable means 2 for attachment to conventional auto hubs.

3 shows the space reserved for brake location, although the typical auto brakes are not shown, being well known in the art. 4 represents the wheel rim and 5 represents the outside flexible tread portion of my tire, while 6 designates the central tread hoop. 7 indicates a wood or plastic filler for each tread hoop and 8 indicates a small deformable hoop made up of concenetric hickory strips or plastic hoops 9 fitting closely together and bonded within and integral with an envelope of rubber 10. These small hoop units 8 are held tightly in their relation to the center tread hoop 6 by means of a rubber lug 11 which fits between lugs 12 molded integral with the rubber tread envelope of hoop 6 and a hickory pin 13 binds the lugs together. The outer tread hoops 5 have lugs 14 molded thereon and in these lugs are button pockets 14' into which the ends of pin 13 snugly fit. The snugness of the fit can be regulated by making the molding pins for the lugs smaller in diameter than the hickory pin so that the latter must be forced into place, using soap water.

Also to assure a very tight fit for the lug 11 over and around the small hoops 8 the mold for the lug should be sized so that the rubber contacting the small hoop 8 must be compressed before the lug 11 can be fastened into place by hickory pin 13.

Figure 10:
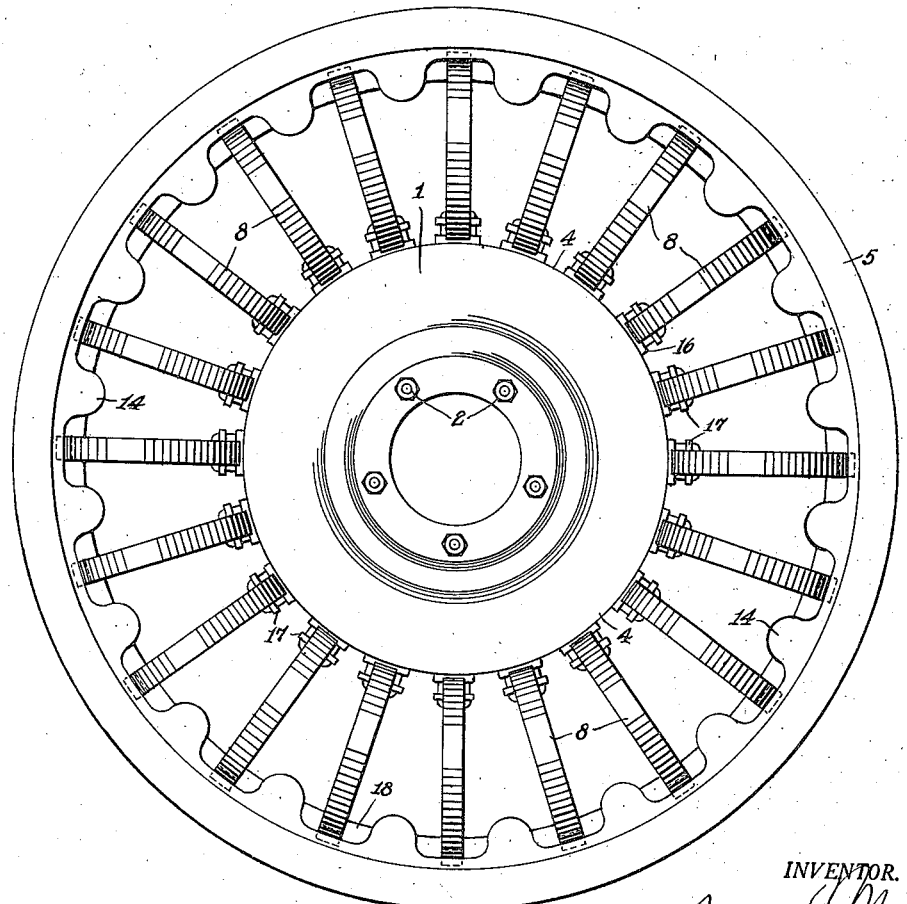

My small hoops 8 are connected to the wheel disc 1 by means of a clamp or flattened U-bolt 15 and I advise distributing the stress of attachment in a graduated fashion from the comparatively rigid wheel 1 to the flexible small hoops 8. This can be accomplished by interposing a rubber 16 or fiber softener with flat bearing surfaces, see Figs. 10 and 11 between the wheel 1 and the hoops 8 and also fiber 17 or semihard rubber or wood in wedge form can be located between the U-bolt and the inside of hoop 8 and along the sides of the flattened U-bolts against hoop 8 see Figs. 3 and 4.

It is most important to have the stress well distributed from the wheel and U-bolts to the flexible small hoops otherwise they will break down in service use at the points where the stress is localized. I have indicated the sort of intermediate cushion and its location at 16 and at 17, see Figures 2, 3, 4 and 10 and 11; if needed the material used can be placed in layers, the softer material being next to the hoops 8 and the harder material next to the wheel 1 and the U-bolt 15.

All outer contacts for hoops 8, such as the rim 4 must be smooth and broad and flat for extreme compression of hoop 8, with no recurves.

The smooth, broad and flat surface of rim 4 where it contacts the hoops 8 must be carried a very substantial distance laterally outward on both sides of the clamp 15, see Figs. 2, 3, 4, 5 and 6, so as to furnish a non-injurious base for the flattened portions of 8 when under extreme compression. The same holds good for the outer portions of 8 under heavy compression; note the dotted lines for this purpose in Fig. 4.

In Figures 5, 6, 7, 8, 9, 10 and 11 I show a slightly modified structure: One difference is the use of a hickory or plastic strip 18 to hold the small hoops in snug contact with the center tread hoop 6, this may be spliced as indicated at 18' in Figure 7.

The hickory strip 18 can be bound tightly in place by metal spring steel straps 19 either cured around the filler 7 of the center hoop 6 or the band 19 can be inserted as a strip through the broached apertures 20 in the rubber envelope.

The edges of the wood 18 must be prevented from injuring the hoops 8 by a wedge 17' and the rubber hoop cover 10 and by softener 16.

The most important difference of the latter figures over the Figures 1 to 4 inclusive lies in the initially stretched web 21 which functions to prevent the over-distortion of the small hoops and to provide yieldable resistance to nearly all distortion.

It will also be noticed that in place of the rubber lugs 12 and 14 of Figure 4, I show lugs 14a on each hoop 5 of Figure 7 and 12a of the center hoop 6 for the connections between the tread hoops themselves. Hickory pins 13a are shown in Figure 7 which have buttons 13b which fit into pockets similar to the pockets 14' already shown in Figure 4. It will be observed how neat and light weight the new connections are.

Figure 8A:
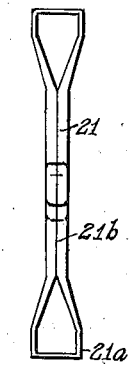
Figure 8a is a view of a separate rubber cover for the small hoops, shown in a relaxed condition.
Figure 9:
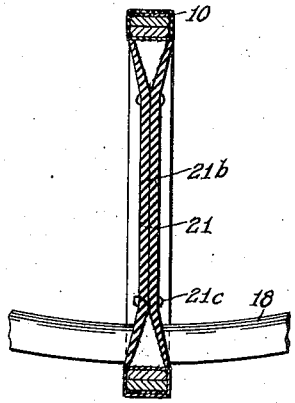
Figure 9 is a view partly in section taken along the line 9—9 of Figure 6.

The rubber webs 21 are provided with expanded loops 21' and bifurcated loops 21a. These are to be proportioned so as to carry the stress of the thicker web over and round the hoops 8. It will be observed that the center portion of my webs in their own radial plane are separated when they are molded so that they may be stretched apart on the line 21b and rings or bands 21c can hold the parts together after the small hoops 8 have been inserted within the webs 21. Figure 8a shows that the molded size of these webs 21 is considerably smaller than their stretched state as shown over the hoops 8 after hoops 8 have been inserted within the webs 21. Figure 8a shows that the molded size of these webs 21 is considerably smaller than their stretched state as shown stretched over the hoops 8 in Figures 6, 8 and 9.

One of the most important improvement novelties in the present invention is the arrangement of multiple hoops within each other and free at least to a limited degree to deflect through a comparatively great range: In other words, if one hoop were used to compose the small hoop 8 the strength would be much greater than desired for the cross section employed or the proportions represented in the drawings, but the range of distortion possible without breaking would be very slight; if however, as shown in Figures 6 and 8, two hoops 9 make up the hoop 8, then the range of movement is more than doubled, while the load carrying ability is not cut in half. Close contact between the hoops is important and bonding a skin of rubber between hoops 9 will also soften up the flexing range if the rubber skin is thick enough.

This surprise result, i. e., the vast increasing of the range of possible deflection in the hoop 8 by simply dividing up its series of hoops 9 between skins of rubber 9', see Fig. 2 (for large scale detail of laminating hickory to rubber I refer to Fig. 5 of my Patent No. 2,331,212, issued October 5, 1943), so that the same cross section for 8 gives us more hoops with less thickness each and the lesser thickness hoops located inwardly of a thicker hoop, see Figure 2, which shows three instead of two hoops as 9, also see Figure 3 for cross section. The inner or smallest of the series of hoops 9 for best results, should be of the least thickness.

Thus it will be seen that by multiplying the number of hoops and reducing their thickness accordingly as they are inwardly located we obtain more range of movement, but less carrying capacity per hoop. However, since the rubber cover is not necessary all way round the small hoops 8 it can be eliminated and another or fourth strip or coil of hickory substituted and this will not materially affect the range of flexing, but will much increase the load carrying capacity. While I recommend multiplication of layers 9 (see Figure 3) of hoops 8 even to eliminating the rubber envelope, I advise retaining rubber adjacent to all connections of the hoops 8. Whatever clamping means is employed to marry the small hoops to the wheel rim must centralize its most severe stress at only one line on the circumference of the small hoop and very finely graduate the delivery of such stress until it disappears entirely at the extremity of said clamp.

The practice often seen in the prior art of making a bolt hole or aperture in the spring hoops weakens them at the position most needing strength.

Tests indicate that the hoops 8 can be compressed about 1/3 further in range than they can be pulled, for that reason I discovered another surprise result in the combination of distortable circles for a tire, i. e., my combination presents outermost tread hoops 5 and 6 which can distort more on their lower halves because the smaller hoops 8 within them below the axle can be compressed more than the small hoops above the axle can be pulled. The small hoops on the sides of the axle bend readily in reverse curves as indicated in Figure 11, when the axle loads become very great as they do when hitting bad roads at high speeds.

For an example of how the tread hoops deform under load, see Figure 6 of my Patent No. 2,331,212, issued October 5, 1943, but bear in mind that with the present improvement, such as the small hoops 8 replacing the elastic spokes, the flattening of the tread hoops is not so pronounced as with elastic spokes and the vertical cross sections of the tread and correspondingly their weight can be reduced because the lower arcs of the tread hoops are supported by the small hoops in compression. For prior structures see my Patents Nos. 2,298,142, 2,283,274, and 2,235,378.

The initial tension on the webs 21, see Figures 6 and 8a, can be made anything desired, but care should be taken not to put so much tension into the webs that they pull the small hoops in the same direction as the static loads pull them. In other words, the static load should just about relax the tension on the web in one direction while increasing the tension at right angles thereto.

Those skilled in the art will readily understand that the 5 lower small hoops adjacent the ground in Figure 11 are compressed; the third hoop up from the ground on each side is practically neutral excepting for a small twisting strain and all the other small hoops, i. e., 13 out of the twenty shown are in tension. Reference is made to Patent No. 1,909,878 of May 16, 1933.

Still another surprise result obtained by my novel arrangement of hoops within hoops is the lateral strength obtained from these very light weight hoops 8: This is due to the proportions shown in Figures 2 and 3 made up of separate small hoops fitted closely together. Also the flexible connections by means of lugs between the tread hoops themselves and between the center tread hoop and the small hoops 8 are a great advantage enabling the treads to take differing positions in the radial planes corresponding to uneven road surfaces.

Having given specific examples of how my invention operates, it will be readily understood that considerable modifications may be made within the proper scope of my invention and what I claim particularly is:

1. In a vehicle wheel and tire combination, a flexible tread portion for the said tire and transversely disposed small hoops yieldably spacing the said wheel and tread portion apart, each said small hoop comprising multiple strips of hickory bonded to thin layers of rubber and bonded within a rubber envelope integral with the said layers of rubber.

2. A wheel rim and resilient tire combination including at least three flexible tread hoops, the inner of said hoops resiliently connected at intermediate points around the circle to the said rim and the two laterally outer of said hoops not having any direct connection to said rim, but having yieldable connections to said inner hoop, said latter connections located along the insides of the said tread hoops and between the first said connections.

3. In combination with a wheel, a tire including a flexible tread portion, transversely arranged and intermediately spaced hoops yieldably forming a connection between the said wheel and the said tire tread portion and each of the said hoops provided with rubber across one of its diameters, whereby said rubber will yieldably resist an increase in the said diameter.

4. In combination with a wheel rim, a tire having flexible tread hoops, smaller hoops attached to the said tread hoops and yieldably separating them from the said rim, each said smaller hoop including two or more flexible layers and rubber stretched across the diameter of the said smaller hoop approximately midway between the said hoop attachment and the said wheel rim.

5. In combination with a vehicle wheel rim, a tire including sets of large and small diameter hoops, the said larger hoops arranged to surround the said smaller hoops and positioned in planes substantially transverse thereto and the said larger hoops provided with a road tread for the said tire, the said road tread extending laterally beyond the outermost portions of the said smaller hoops to protect same from curb contacts; the inner portion of each said smaller hoop attached to the said wheel rim.

6. In combination with a wheel rim and a tire, the said tire having a comparatively broad and flexible tread portion spaced from the said wheel rim by group of hoops, each said group including at least three concentric strips of wood in circular form, each said group of hoops clamped to the said rim by means including material of graduated hardness, the softer material contacting the said wood strips and the hardest material immediately contacting the said wheel rim.

7. In combination with a wheel rim and flexible tire tread, multiple hoops made up of wooden strips in substantially concentric circles and adapted to yieldably space the said rim and tread apart and flexible clamping means of progressively harder materials forming the connection of each said series of hoops to the said wheel rim, the said means adapted to deliver wheel stresses in a graduated manner to the said hoops in both tension and compression loadings.

8. A wheel rim and a vehicle tire including distortable tread hoops in parallel planes and smaller distortable hoops arranged in planes substantially at right angles thereto and yieldably spacing said tread hoops from the said wheel rim, graduated stress delivering clamps including materials of increasing hardness surrounding the innermost parts of each said smaller hoop, whereby the maximum distortion of said smaller hoops within practical working limits can be obtained in compression, tension and in twisting movements and the said clamps and adjacent bearing surfaces for contact of the said hoops being substantially flat, whereby recurving of said hoops under flexing will be prevented.

9. A vehicle wheel rim and tire combination wherein the said rim presents substantially flat surfaces to contact distortable hoops clamped to the center of the said rim by a clamp means extending from said rim around the sides and over the insides of each said hoops and including materials of graduated hardness and a tapering wedge as a part of said clamp to graduate the stress of said clamp to the said inside of each said hoop and the said rim providing substantially flat bearing surfaces for contact of the said hoops, whereby, on extreme flexing, recurves in said hoops will be prevented.

10. A wheel rim and resilient tire tread combination wherein the said rim and tread are interconnected by flexible hoops and the outermost portion of the said rim provided at intervals with flat cushions adjacent each of its said connections to the said hoops, whereby the said hoops when under compression, within practical working limits, will have rim support for their flattened out portions without taking a reverse curve.

11. A wheel rim and tire combination wherein the said rim is provided with multiple flattened portions and the tire includes a flexible tread portion spaced apart from the said flattened portions by multiple units of hoops arranged in concentric form within each other, the hoops of smaller diameter being of less thickness than the next larger diameter hoop and the largest of the said hoops in each unit adapted under working compression loads to flatten out in contact with the said flattened rim portions.

12. A wheel rim and tire combination including sets of inner and outer flexible hoops, the said outer hoops provided with a ground engaging rubber-like tread and each of said inner hoops composed of multiple flexible concentric rings attached as a unit to the said outer hoops and also to the said wheel rim, one of the said rings differing in thickness from the others.

13. In combination with a wheel rim, a tire having flexible tread hoops, smaller hoops resiliently intervening between said tread hoops and wheel rim, said smaller hoops attached to the said tread hoops and, through a cushion, attached to the said wheel rim, each of said smaller hoops composed of a series of rings held in laminated relationship to each other by the said attachments and one of the said rings differing in thickness from the others.

14. A vehicle wheel rim and a tire having a flexible tread portion, resilient inner hoops interconnecting said rim and tread portion and each said inner hoop including multiple thin strips of flexible mtaerial arranged in a concentric circle and clamped to flattened places on the said rim, the said flattened places being substantially smooth plane surfaces in directions at right angles to each other, whereby under waximum working loads the said strips will flatten onto the said places without recurve.

JAMES V. MARTIN.

REFERENCES CITED

The following references are of record in the file of this patent:

UNITED STATES PATENTS

| Number | Name | Date |
|---|---|---|
| 481,460 | Ashley | Aug. 23, 1892 |
| 690,872 | Peck | Jan. 7, 1902 |
| 1,259,697 | Wills | Mar. 19, 1918 |
| 1,272,576 | Thompson | July 16, 1918 |
| 1,284,472 | Schnittker | Nov. 12, 1918 |
| 1,327,478 | James | Jan. 6, 1920 |
| 1,659,938 | Anderson | Feb. 21, 1928 |
| 2,283,274 | Martin | May 19, 1942 |